Dec. 8, 1925.
H. O. HEM
WEIGHING SCALE
Filed Sept. 10, 1923    2 Sheets-Sheet 1
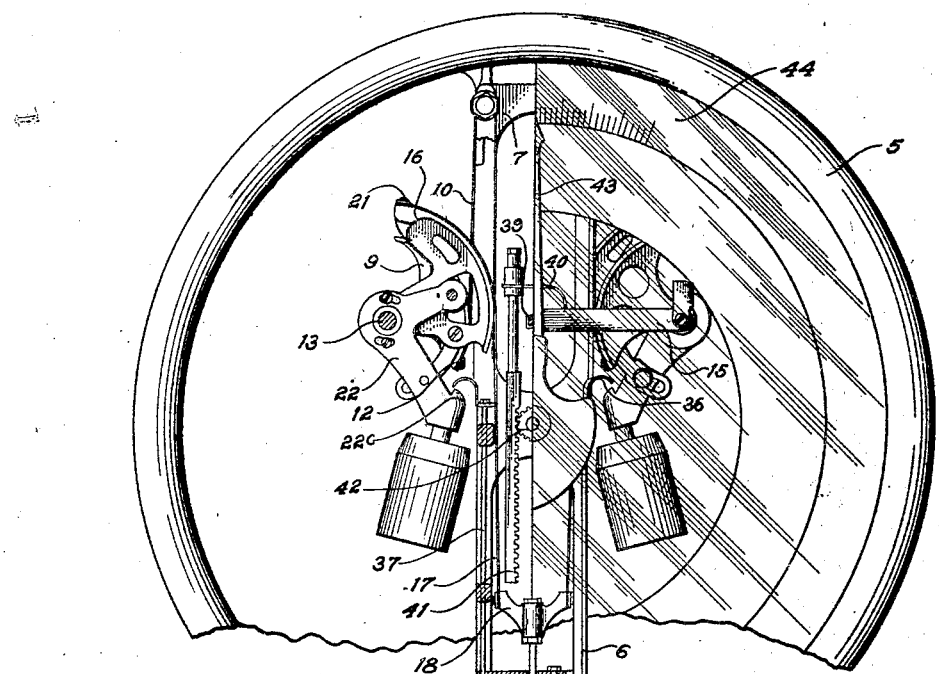
Fig. I.
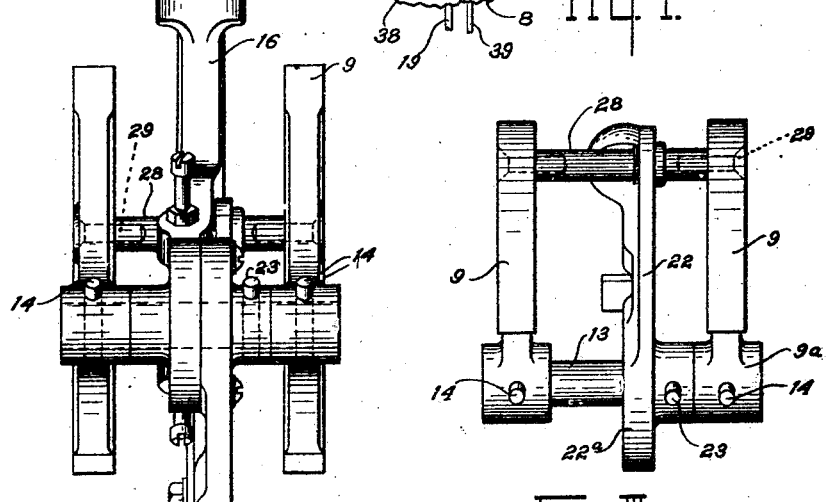
Fig. II.
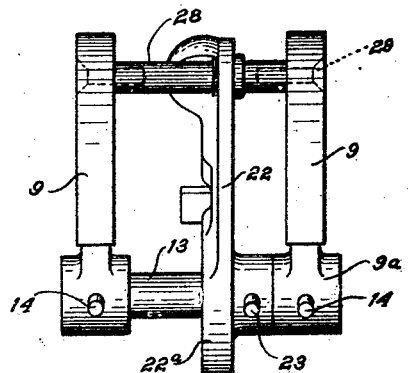
Fig. III.
Inventor
HALVOR O. HEM.
By C. W. Marshall
Attorney Dec. 8, 1925.  
H. O. HEM  
WEIGHING SCALE  
Filed Sept. 10, 1923
1,564,847
2 Sheets-Sheet 2
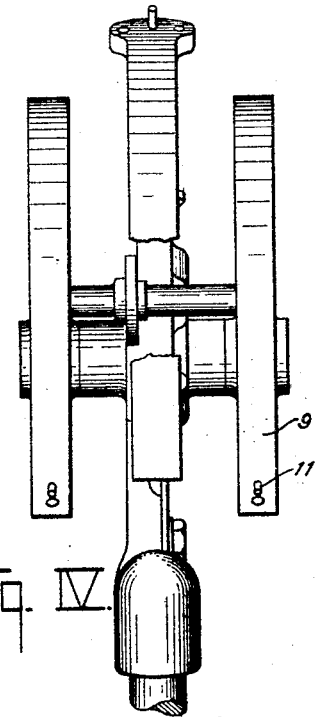
Fig. IV.
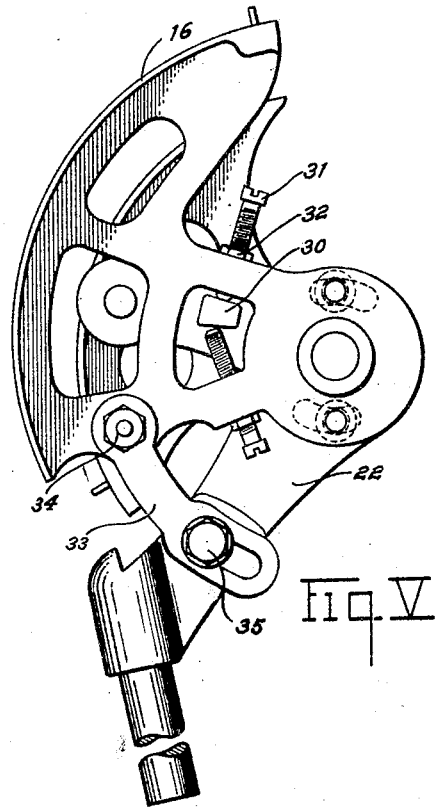
Fig. V.
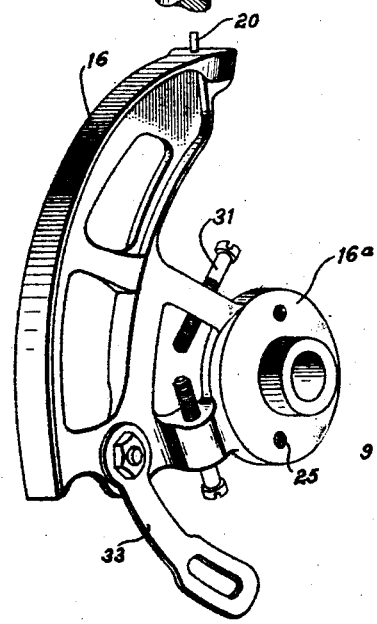
Fig. VI.
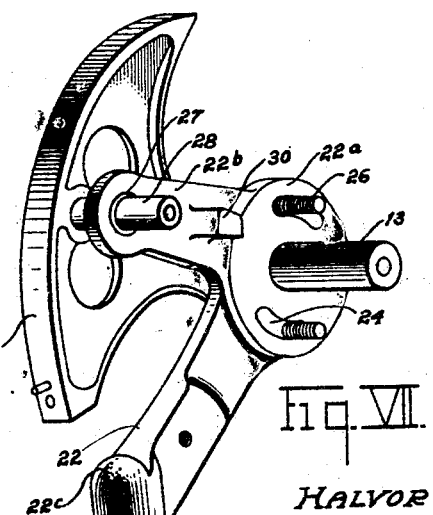
Fig. VII.
Inventor  
HALVOR O. HEM.  
By C. Marshall  
Attorney Patented Dec. 8, 1925.

1,564,847

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed September 10, 1923. Serial No. 661,831.

*To all whom it may concern:*

Be it known that I, HALVOR O. HEM, a citizen of the United States, residing at Toledo, in the county of Lucas, State of Ohio, have invented new and useful Improvements is Weighing Scales, of which the following is a specification.

This invention relates to pendulum weighing scales and more particularly to the pendulum mechanism thereof.

In the practical use of pendulum scales, it is necessary to provide means for adjusting the lever distances through which the pendulum acts to offset the weight of commodities being weighed and correctly indicate such weight on a fixed chart. Where the type of pendulum employed has a rolling fulcrum, as for example, that illustrated in the patent to Hapgood, 1,203,611, issued November 7, 1916, such adjustments are ordinarily made by varying the angular positions of the fulcrum sectors. Difficulty has been found however, in maintaining such adjustments of the fulcrum sectors, especially when the scale is of the portable type and is moved about over rough floors and loading platforms.

The primary object of my invention is to improve the existing forms of pendulum construction by providing means for rigidly holding the fulcrum sectors in any desired positions and making needed adjustments relative thereto.

Other objects and advantages will be apparent from the following description wherein reference is had to the accompanying drawings illustrating a preferred embodiment of my invention and wherein similar reference numerals designate similar parts throughout the several views.

In the drawings:

Fig. 1 is a front elevation of my improved pendulum mechanism, parts being broken away to show the interior construction.

Fig. 2 is a side elevation of one of the pendulum assemblies looking in the direction of the arrow in Fig. 1.

Fig. 3 is a plan view of the pendulum stem and fulcrum sectors.

Fig. 4 is a side elevation of one of the pendulum assemblies looking from the opposite side of that shown in Fig. 2, parts being broken away.

Fig. 5 is a rear elevation of the pendulum assembly.

Fig. 6 is a detail perspective view of the power sector of the pendulum, and

Fig. 7 is a detail perspective view of the pendulum stem and one of the fulcrum sectors in position.

Referring now to the drawings, the numeral 5 designates a scale housing for enclosing the weighing mechanism of the scale and adapted to rest upon a suitable column or other support arranged in juxtaposition to the platform and platform lever mechanism of the scale. It is to be understood that any suitable platform and platform lever mechanism may be employed in connection with the weighing mechanism of the scale, the weighing mechanism herein shown being designed to satisfactorily operate when employed in various forms of scales, as for example in dormant, portable or hanging scales.

The weighing mechanism of the scale comprises a rectangular frame having four vertical pillars 6 suitably supported upon the scale housing and secured together at the top and bottom by cross pieces 7 and 8 respectively. The pillars 6 form bearings or tracks for fulcrum sectors 9 forming part of the oppositely disposed pendulums which are supported in position by flexible ribbons 10 of steel or other suitable metal fastened to the lower extremity of the sectors 9, as by dowel pins 11 and screws 12, and at their upper ends to the pillars, being thus interposed between the pillars and the sectors at every position of the latter. The hubs 9ª of the sectors 9 are secured upon the shafts 13, as by the pins 14 extending through the hubs and shafts. The two shafts are connected together by slotted cross bars 15, substantially as shown in Fig. 1, the sector shafts 13 and side bars 15 forming a rectangular frame flexibly connected and capable of automatic adjustment as hereinafter set forth. The sectors 9 are four in number, there being a pair upon each side of the rectangular frame and the hub members of each pair being secured adjacent the ends of the common shaft 13 (see Fig. 3).

Intermediate each pair of sectors 9 is a somewhat larger sector or eccentric 16, herein referred to as the power sector, this sector extending between the pillars upon the same side of the rectangular frame and being connected by flexible ribbons 17 with the equalizer bar 18 which in turn is connected by the link 19 with the platform lever mechanism of the scale. The flexible ribbon 17 extends over the peripheral face of the sector 16 and is attached at its upper end to the upper end of the sector, as by the dowel pins 20 and screws 21. The hub 16$^a$ of the power sector 16 is adapted to encircle the shafts 13 intermediate the fulcrum sectors 9 (note Fig. 2) but are not secured to the shafts, being mounted for adjustment relative thereto as hereinafter pointed out.

Weight supporting members 22 are also fixed to the shafts 13, as by pins 23, intermediate the power sectors 9, the hubs 22$^a$ of these members having an enlarged portion adapted to contact with a similar enlarged portion of the hubs 16$^a$ of the power sectors. In one of the enlarged hub portions, as 22$^a$, a pair of circumferential slots 24 are provided and in the other, as 16$^a$, apertures 25 are provided aligning with the circumferential slots 24, locking screws 26 being adapted to extend through the apertures 25 and slots 24 to bind the hubs of the power sector and weight carrying member 22 in various adjusted positions. A supporting arm 22$^b$ extends angularly forward from the hub 22$^a$ of the weight carrying member (note Fig. 7), the arm being apertured, as at 27, to receive a brace bar 28, to the ends of which are firmly secured the peripheral portions of the fulcrum sectors 9, as by screws 29. A lug 30 extends laterally from the supporting arm 22$^b$ toward the power sector for contacting with the oppositely disposed adjusting screws 31 carried by the power sector (note Fig. 5). By virtue of this construction whenever the locking screws 26 are loosened the power sectors 16 can be swung in either direction around the shafts 13 by turning the adjusting screws 31 in the desired direction. Lock nuts 32 are preferably provided to hold the adjusting screws 31 in their adjusted positions and with the locking screws 26 firmly securing the power sectors 16 in various adjusted positions. For additional security in locking the power sectors 16 in their adjusted positions I provide slotted links 33 between the lower portions of the power sectors and the lower arm of the weight supporting member 22, (note Fig. 5) securing bolts 34 and 35 being provided to hold the opposite ends of the links 33 firmly against the power sectors and weight supporting member respectively.

From the above it will be apparent that I have provided a pendulum weight offsetting mechanism wherein each pendulum has a pair of spaced fulcrum sectors and a pendulum weight firmly secured to each other in relatively immovable positions, and all needed adjustments made relatively thereto. This is particularly desirable in portable or hanging scales, which are often transported from place to place, and during such transportation need the pendulums firmly braced to prevent distortion of the flexible ribbons 10. The present construction admits of the locking of the pendulums against the frame pillars 6 of the framework of the scale by means of a pair of hooks 36 secured at the upper extremity of links 37 and adapted to co-act with the notched lower extremity 22$^c$ of the weight supporting members of the pendulums. The lower extremities of the links 37 are mounted in a cross bar 38, which is connected with a suitable handle for moving the hooks 36 into and out of engagement with the notched portions 22$^c$ of the pendulums. It is evident that regardless of the adjusted position of the power sector 21 the hooks 36 and notched portions 22$^c$ of the pendulums will co-act without undue strain on the supporting ribbons 10.

In operation, when a commodity is placed upon the scale platform the platform lever mechanism, acting if desired through intermediate mechanism, lowers the link 19 and equalizer bar 18 to pull down upon the ribbons 17 connected with the power sector 16 of each pendulum and rocking the pendulum assembly on the fulcrum sectors 9, which roll upwardly along the pillars 6 and swing the pendulum weights outwardly to positions offsetting the weight of the commodity on the platform. This upward movement of the pendulum assemblies is utilized to operate the indicating mechanism of the scale. In the illustrated embodiment a cross bar 39 is pivotally mounted between the side bars 15 and carries a leaf spring 40 to which is adjustably secured a rack bar 41 meshing with a pinion 42, on the shaft of which is secured an indicator hand 43 adapted to pass over the graduated chart 44 suitably secured in the housing 5. When the pendulum assemblies move upwardly in the load-offsetting operation the rack bar 38 is moved upwardly to the same extent, rotating the pinion 42 and indicator hand 43 to indicate upon the chart 44 the weight of the load on the platform.

I have heretofore referred to the sectors 9 and 16 as though their peripheral surfaces were true arcs of concentric circles, and in fact they might be so made, but in that event the angular displacement of the indicator hand would not increase increment for increment with the addition of load on the platform, for the reason that the turning movement or torque of the pendulums increases more rapidly at some portions of their paths than at others. Accordingly if the peripheral surfaces of the sectors were true arcs of concentric circles the distance between the weight indications upon the chart 41 must necessarily be varied. It is possible, however, to correct for this variation in the pendulum mechanism and so employ a chart having equally spaced weight indications, but to do so I must vary the peripheral surfaces of the sectors 9 and 16, or either of them, or their eccentricities with respect to each other so that each equal increment of weight from zero to the full capacity of the scale is represented by the same angular displacement of the indicator hand. In the illustrated embodiment the sectors are true arcs but eccentrically located with respect to each other, and the peripheral surfaces are somewhat longer than the normal operation of the scale requires to permit of adjustment to bring the part actually effective into use to permit the desired torque of the pendulums with equal increments of weight according to the markings on the chart. For this purpose I mount the power sector 16 to permit its angular adjustment with relation to the remaining parts of the pendulum assemblies, and the needed adjustment is positively effected by the oppositely disposed weight screws 31, the adjustment being maintained by the laterally extending locking screws 26 and the links 33. By appropriately changing the position of the power sectors 16, or either of them, it is possible to make the indicator hand 43 align with each indication on the chart 44 throughout the entire capacity of the scale, and such positions can be made permanent by the locking means above described. And such adjustments can be made without altering the position of the weight supporting members 22, whereby they are always in position to be contacted by the hooks 36 whenever it is desired to reclamp the pendulums during transportation of the scale. Moreover, with only one sector of the pendulum assemblies adjustable there is less likelihood of the pendulums failing to maintain the desired adjustment in every day use, the multiplicity of securing means on this adjustable sector also safeguarding the maintenance of the desired adjustment.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim—

1. In weighing scales, a dial, a pointer movable thereover, means for moving the pointer during the weighing operation including a pendulum having a weight, a fulcrum sector carried thereby and rigid with said weight and a power sector adjustably mounted on the pendulum and movable relatively to said weight to vary the position of the pointer relatively to the graduations on the dial without altering the zero position of the weight.

2. In pendulum weighing scales, a pendulum having a weight, a pair of fulcrum sectors fixed in substantially rigid position relatively thereto, and a power sector mounted for swinging movement relatively to the weight and fulcrum sectors to provide means of adjustment for counterbalancing without changing the zero position of the weight.

3. In pendulum weighing scales, a pendulum comprising a frame carrying a weight and fulcrum sectors rigidly secured thereon, and a power sector pivotally mounted on the frame to swing relatively to the fulcrum sectors and weight, whereby adjustment is provided for offsetting weight without altering the normal position of the frame.

4. In pendulum weighing scales, a pendulum comprising a shaft, a weighted stem fixed thereon, a pair of fulcrum sectors fixed on the shaft, a power sector mounted for swinging movement on the shaft, and means for securing the power sector to the stem in any adjusted position.

5. In pendulum weighing scales, a pendulum comprising a shaft, a fulcrum sector fixed on the shaft, a bell-crank lever fixed on the shaft and having one arm secured to the fulcrum sector, a weight carried by the other arm of said lever, a power sector revoluble upon the shaft, and means for securing the power sector to said lever in any adjusted position.

6. In pendulum weighing scales, a pendulum comprising a shaft, a fulcrum sector fixed on the shaft, a bell-crank lever fixed on the shaft and having one arm secured to the fulcrum sector, a weight carried by the other arm of said lever, a power sector revoluble upon the shaft, and means for securing the power sector to both arms of lever in any adjusted position.

7. In pendulum weighing scales, a pendulum comprising a shaft, a fulcrum sector fixed on the shaft, a bell-crank lever fixed on the shaft and having one arm secured to the fulcrum sector, a weight carried by the other arm of said lever, a power sector revoluble upon the shaft, and means for securing the power sector to both arms of lever in any adjusted position, and means engaging the bell-crank lever to lock the pendulum against movement.

HALVOR O. HEM.